United States Patent [19]

Hiramatsu et al.

[11] Patent Number: 4,687,536

[45] Date of Patent: Aug. 18, 1987

[54] APPARATUS FOR CENTERING AND ATTACHING A REINFORCING RING TO A FLOPPY DISK

[75] Inventors: Kenichi Hiramatsu; Hidebumi Nozawa, both of Odawara City; Takashi Yamauchi, Yokohama City, all of Japan

[73] Assignee: Kasei Verbatim Corporation, Sunnyvale, Calif.

[21] Appl. No.: 874,986

[22] Filed: Jun. 16, 1986

[30] Foreign Application Priority Data

Jul. 2, 1985 [JP] Japan ................................. 60-145486

[51] Int. Cl.[4] .......................... B32B 31/20; G11B 5/82
[52] U.S. Cl. ................................. 156/556; 156/297; 156/538; 156/514; 156/580; 360/135
[58] Field of Search ............... 156/252, 253, 261, 513, 156/443, 518, 514, 538, 297, 556, 580; 227/15, 17, 21, 66; 360/135

[56] References Cited

U.S. PATENT DOCUMENTS

| | | | |
|---|---|---|---|
| 3,668,658 | 6/1972 | Flores et al. | 340/174 |
| 4,052,750 | 10/1977 | Barber et al. | 360/135 |
| 4,071,869 | 1/1978 | Feierabend et al. | 360/135 |
| 4,155,798 | 5/1979 | Becker | 156/461 |
| 4,370,689 | 1/1983 | Davies | 360/135 |
| 4,387,114 | 6/1983 | Conner et al. | 427/54.1 |
| 4,480,282 | 10/1984 | Brock et al. | 360/135 |
| 4,539,220 | 9/1985 | Martinelli | 427/44 |
| 4,549,922 | 10/1985 | Oishi et al. | 156/293 |
| 4,613,392 | 9/1986 | Klar et al. | 156/541 X |

*Primary Examiner*—Donald E. Czaja
*Assistant Examiner*—Jeff H. Aftergut
*Attorney, Agent, or Firm*—Dennis P. Monteith

[57] ABSTRACT

Apparatus for positioning and attaching a reinforcing ring in coaxial relationship to a floppy disk, includes a force translating mechanism mounted for movement to and from a resiliently mounted circular receiving member. A cylindrical positioning member, connected to the force translating mechanism, has first and second concentric reference surfaces corresponding respectively to the inner diameter of the reinforcing ring, which is carried by the force translating member, and the inner diameter of the floppy disk, which is disposed about the receiving member. During movement of the force translating mechanism toward the receiving member to bring the reinforcing ring into bonding relationship with the floppy disk, the positioning member moves axially relative to the force translating mechanism between (1) a first position in which the first reference surface causes the force translating mechanism to carry the ring in a predetermined disk-attaching position, to (2) a second position engaging the receiving member in which the second reference surface causes the floppy disk to be located in a position concentric with the disk-attaching position of the ring.

5 Claims, 4 Drawing Figures

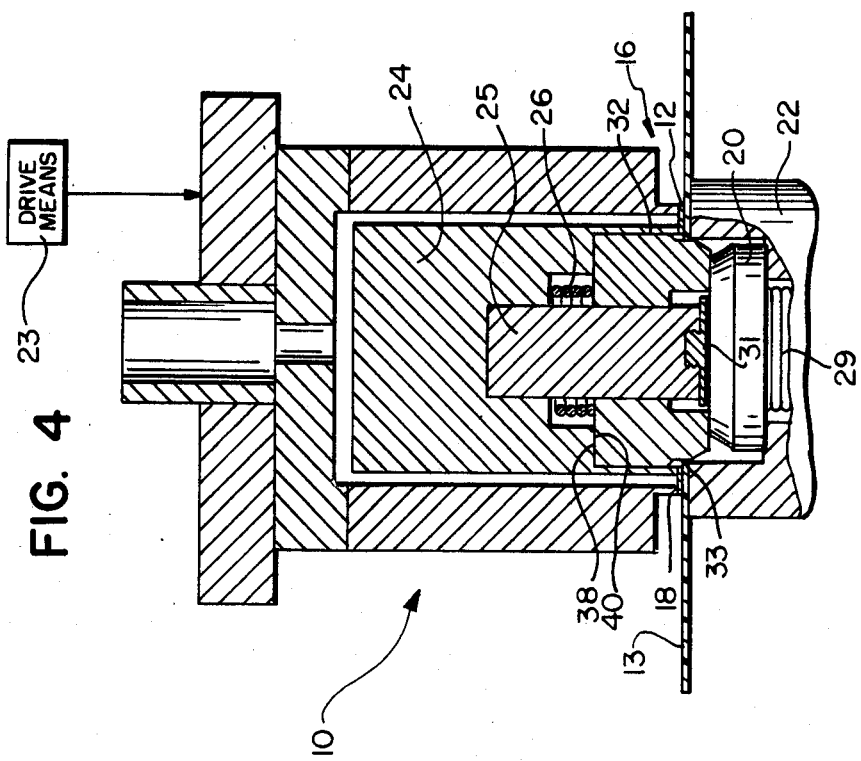
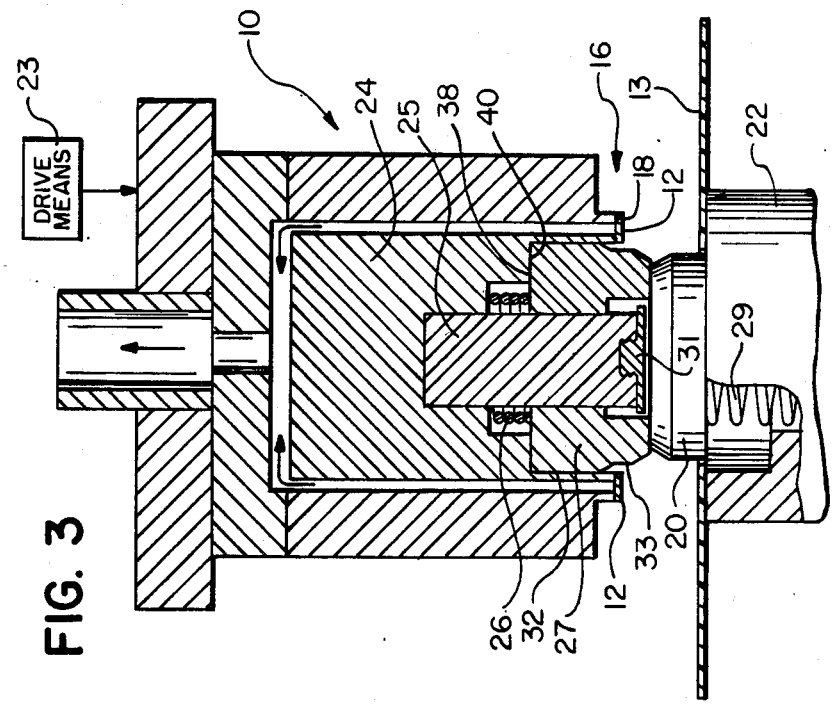

APPARATUS FOR CENTERING AND ATTACHING A REINFORCING RING TO A FLOPPY DISK

BACKGROUND OF THE INVENTION

1. Field of the Invention

The invention relates to manufacture of a flexible recording disk of the type used in a digital data storage unit. More particularly, the invention relates to apparatus for positioning and attaching a reinforcing ring about a spindle drive aperture of the disk.

2. Description Relative to the Prior Art

In the following description of the relevant prior art, reference is made to FIG. 1, of the accompanying drawings, which shows apparatus, known in the art for positioning and attaching a reinforcing ring about a spindle drive aperture of a flexible recording disk.

A "floppy disk" assembly includes an envelope enclosing a disk of flexible material such as polyethylene teraphthalate ("PET"). A material including magnetic particles, preferably ferric oxide ($Fe_2O_3$), covers one or both surfaces of the disk. The disk has a central aperture made precisely to rigid standards for fitting upon an output spindle of a disk drive mechanism. Likewise, the envelope has apertures therethrough for receiving the spindle, for indexing, and for receiving a read/write head of the drive mechanism for transferring information to and from the data storage area of the floppy disk. U.S. Pat. No. 3,668,658, issued to Flores, et al., discloses a method of constructing a floppy disk assembly.

One of the primary problems encountered in the use of a floppy disk is the centering of the disk precisely on the spindle of the drive mechanism. Centering is of extreme importance because it is necessary that the same data be at exactly the same position with respect to the read/write head and an index point each time the disk is placed upon the spindle. If the disk is not precisely centered, indexing for the read/write head will not operate in an optimum manner. Variations in the centering of the disk may make it necessary for the read/write head to scan a wider area or track, to find the desired information. This limits the number of tracks, and thus the amount of data, which can be recorded on a given disk.

The problem with centering the disk is further complicated because the drive spindle subjects the material immediately surrounding the central aperture of the disk to stress forces during both insertion of the disk into the drive mechanism and rotation of the disk within its envelope. It is known in the prior art that these stress forces may damage the central aperture of the disk. Ultimately, this damage may become so extensive as to render the disk totally inoperable. Even if such damage is not so severe, it may be, however, the source of misalignment between the drive spindle and the disk, thereby causing data reading failures.

A variety of prior art attempts has dealt with strengthening the central aperture of the disk, to extend its useful life. These attempts have usually been in the form of providing a reinforcement ring about the central aperture on one or both sides of the disk, to prevent the drive spindle from damaging the aperture and thereby rendering the disk unuseable. U.S. Pat. Nos. 4,052,750 (Barber, et al.) 4,370,689 (Davies), 4,387,114 (Conner, et al.), 4,480,282 (Brock, et al.) and 4,539,220 (Martinelli) disclose a flexible disk having a central aperture reinforcement structure. None of the above-mentioned patents, however, addresses the specific problem of precisely centering a reinforcing ring on a disk. When the ring is not concentric with the disk, the appearance of the disk is unfavorable to a user; more importantly, the disk assembly lacks the degree of accuracy that is necessary to prevent misalignment between the drive spindle and the disk.

Even when the reinforcing ring is concentric with the disk, the reinforcement structure of the prior art may suffer from a disadvantage in that an adhesive used to attach the ring to the disk may come into contact with the bonding apparatus during the assembly operation. The adhesive must remain in place or it will foul the contact surface of the bonding apparatus and thus interfere with subsequent bonding operations. This problem is exemplified with the reinforcing structure and method described in the aforementioned U.S. Pat. No. 4,480,282 in which a flexible disk has a central aperture which is slightly greater than the aperture of a reinforcing ring. When the ring and disk are precisely centered with respect to each other, only the ring, which is made of a physically strong non-malleable material, would contact a disk drive spindle. With a disk assembly of this design, it is required that the adhesive be one which hardens quickly and requires only a slight bonding force to set the bond between the ring and disk. To fabricate a floppy disk assembly in accordance with that description, however, it is difficult to prevent the adhesive from adhering to the contact surface of the bonding apparatus. This makes it possible for dirt and other contaminants to adhere to the adhesive on the bonding apparatus and thereby produce dimensional errors or obstacles with respect to the periphery of the central disk drive aperture of disk assemblies produced during subsequent bonding operations.

Furthermore, long term usage of floppy disk assemblies, constructed in accordance with that description or other prior art structures in which the central apertures of the ring and the disk are precisely the same size, results in the adhesive oozing from between those members to project within the area of the central drive aperture. Consequently, in time, a spindle of the reading and writing apparatus driving the floppy disk assembly becomes contaminated with adhesive.

FIG. 1 shows conventional bonding apparatus 10 for positioning and attaching a reinforcing ring 12 to a flexible disk 13. The ring 12, with an adhesive 14 facing downwardly, is arranged around the neck 15 of a suitable force translating mechanism 16, one at a time. Preferably, a vacuum pump (not shown) serves to hold the reinforcing ring 12 pneumatically, as shown diagrammatically by the arrows, against a circular lip 18, which serves to press the ring 12 against the disk 13.

As shown, the disk 13 is placed about a resiliently mounted receiving member 20 centrally disposed in a disk stand 22. Suitable drive means 23 provides for raising and lowering the mechanism 16 relative to the disk stand 22. The mechanism 16 engages and thereby depresses the receiving member 20, to bring the ring 12 into contact with the disk 13. As the mechanism 16 passes through the central aperture of the disk 13, the tapered end of the neck 15 serves to correct any significant misalignment between the center of the disk 13 and the center of the ring 12. When the mechanism is lowered completely, the lip 18 presses the reinforcing ring 12 against the disk 13, whereby the ring is attached to the disk by the adhesive 14 on the downwardly facing side of the ring.

To assist in preventing the adhesive 14 from contacting the apparatus 10 during a bonding operation, the size of the inner diameter of the reinforcing ring 12 is usually somewhat larger than the size of the inner diameter of the disk 13. This feature, however, makes it possible that either the ring 12 and/or the disk 13 is not always positioned laterally in the same position relative to the neck 15 of the mechanism 16. This makes it difficult to obtain consistently good registration between the aperture of the disk 13 and the aperture of the reinforcing ring 12, thereby presenting an appearance of sloppy workmanship. Poor registration can, of course, prevent the centering of the disk 13 precisely on the spindle of its drive mechanism, thereby causing read/write errors relating to the improper indexing of a disk read/write head. Furthermore, poor registration makes it more likely that adhesive will flow between the adjacent faces of the ring 12 and the disk 13 into the area of the central disk drive aperture or into contact with the bonding apparatus 10.

SUMMARY OF THE INVENTION

In view of the foregoing, an object of the invention is to overcome the aforementioned problems of the prior art and, in so doing, provide manufacturing apparatus of simple design and construction for centering and attaching a reinforcing ring about the periphery of a central aperture of a flexible recording disk. This object is achieved by manufacturing apparatus including a force translating mechanism mounted for movement toward a resiliently mounted receiving member, for centering and attaching a reinforcing ring to a floppy disk. In accordance with the invention, the manufacturing apparatus includes a cylindrical positioning member mounted for axial movement relative to the force translating mechanism and having a first reference surface corresponding to the inner diameter of the reinforcing ring, and a second reference surface, concentric with and smaller than the first reference surface, corresponding to the inner diameter of the flexible disk. The positioning member, in response to movement of the force translating mechanism for attaching the reinforcing ring to the floppy disk, moves axially relative to the force translating mechanism between (1) a first position in which the first reference surface causes the force translating mechanism to carry the reinforcing ring in a predetermined disk-attaching position, and (2) a second position engaging the receiving member in which the second reference surface causes the flexible disk to be located laterally in a position concentric with the reinforcing ring. The force translating mechanism, the cylindrical positioning member, and the receiving member mutually cooperate during movement of the positioning member between its first and its second positions, for positioning and attaching the ring in surrounding relationship to the spindle aperture of the disk during final movement of the force translating mechanism toward the receiving member.

With the inner diameter of the reinforcing ring being greater than the inner diameter of the flexible disk, it is less likely that any adhesive flowing between the adjacent faces of the ring and the disk will contact either the manufacturing apparatus or will flow into the central aperture of the disk assembly.

Because the cylindrical positioning member has reference surfaces corresponding respectively to the reinforcing ring and the floppy disk, both the ring and the disk can be centered with respect to each other even though the size of the inner diameter of the ring is greater than the size of the inner diameter of the disk.

Thus, the disk can have an extended useful life by means of the protection against wear and tear that the reinforcing ring provides; additionally, with the centering of the ring, the disk may be precisely centered upon a drive spindle such that errors in reading or writing on the disk caused by mispositioning of a read/write head are substantially eliminated.

The invention and its other advantages will become more apparent in the detailed description of a preferred embodiment presented below.

DESCRIPTION OF THE DRAWINGS

The invention will be described with reference to the accompanying drawings, wherein:

FIGS. 3 and 4 are cross-sectional views showing different operational positions of the apparatus of FIG. 2.

DETAILED DESCRIPTION OF A PREFERRED EMBODIMENT OF THE INVENTION

Figure 1:
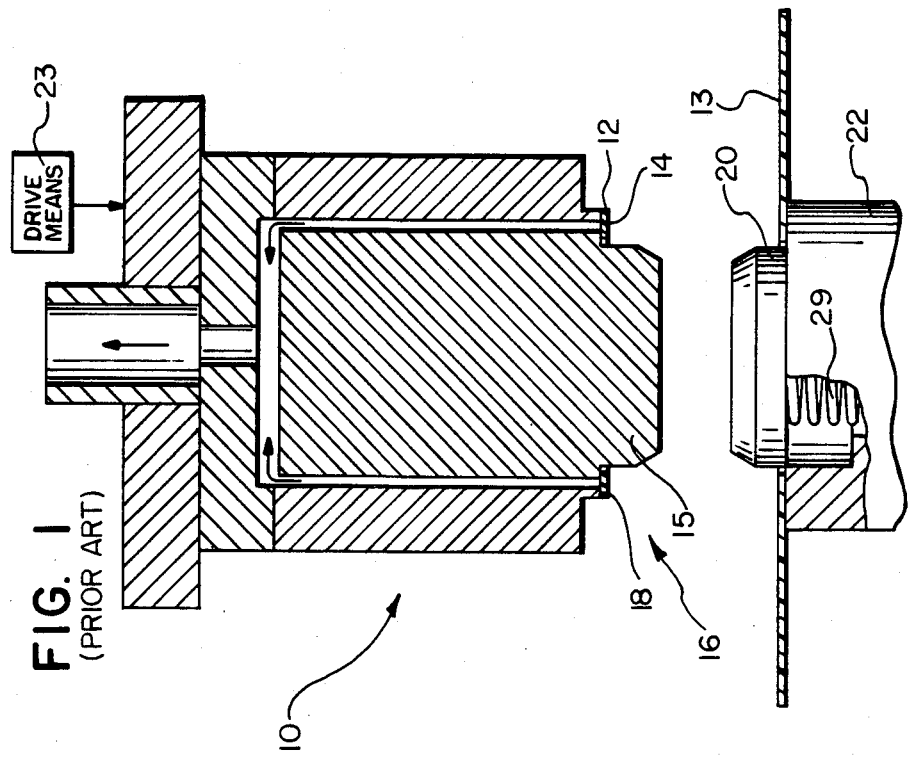
FIG. 1 is a cross-sectional view of apparatus, known in the art, for positioning and attaching a reinforcing ring to a flexible magnetic recording disk.
Figure 2:
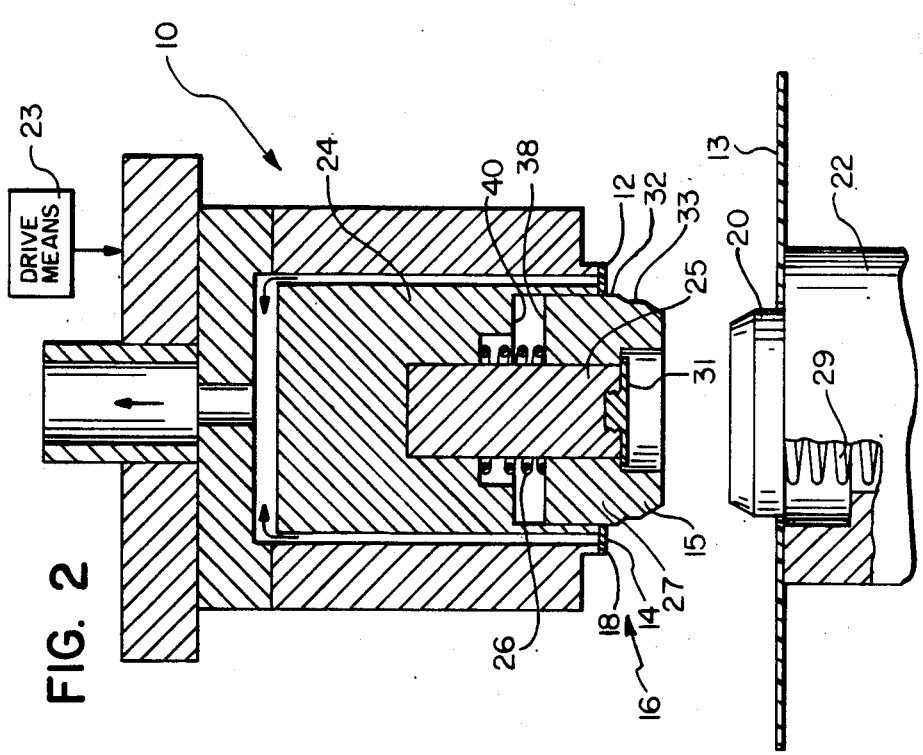
FIG. 2 is a cross-sectional view of apparatus, according to the invention, for positioning and attaching a reinforcing ring to a flexible magnetic recording disk.

FIG. 2 illustrates a preferred embodiment of apparatus 10, according to the invention, for centering and attaching a reinforcing ring 12 to a flexible magnetic recording disk 13. With the adhesive 14 being carried by the reinforcing ring 12, the inner diameter of the ring is selected to be somewhat larger than the inner diameter of the disk 13. Thus, when the ring 12 is attached to the disk 13 any adhesive that flows between their adjacent faces will be less likely to contact the apparatus 10 or to flow into the central aperture of the disk assembly. Other elements of FIG. 2 which are common or substantially similar to elements of FIG. 1 are identified by like numerals.

The body 24 of the force translating mechanism 16 of FIG. 2 includes an elongate guide member 25 projecting outwardly perpendicular to the receiving member 20. A compression spring 26 biases a cylindrical positioning member 27 outwardly for slidable movement along the guide member 25. For a reason made apparent below, the spring 26 has a lower spring force than the force of the spring 29 supporting the receiving member 20.

A screw 31, threaded into the forward end of the guide member 25, serves for restricting outward movement of the positioning member 27 under the influence of the spring 26. The screw 31 also provides for facilitating assembly and maintenance of the apparatus 10.

The cylindrical positioning member 27 serves to position the reinforcing ring 12 in a position concentric with the position of the flexible disk 13, or vice versa. For that purpose, the member 27 includes a first reference surface 32 having a diameter corresponding to the inner diameter of the reinforcing ring 12, and a second reference surface 33, adjacent to and coaxial with the first reference surface, corresponding to the smaller inner diameter of the disk 13.

The operation of the apparatus 10, in accordance with the invention, will now be described: When the force translating mechanism 16 is in its raised position with respect to the disk stand 22, as shown in FIG. 2, the spring 26 urges the positioning member 27 against the head of the screw 31. While in that position, a reinforcing ring 12 is placed about the neck 15. The reference surface 32 positions the ring 12 laterally in a desired disk-attaching position wherein the ring is preferably held pneumatically against the lip 18 by means of air flowing from an air plenum (not shown).

Similarly, a disk 13, which is to receive the ring 12, is disposed about the receiving member 20 of the disk stand 22. The diameter of the member 20 is smaller than the diameter of the central aperture of the disk 13 so that the disk is free to move laterally relative to the member 20.

The drive means 23 then lowers the force translating mechanism 16 for the purpose of attaching the ring 12 to the disk 13. When the positioning mechanism 27 first engages the receiving member 20, the spring 29, being stronger than the spring 26, initially secures the positioning member against additional downward movement as the mechanism 16 continues to move downwardly to bring the ring 12 into engagement with the disk 13. In so doing, the receiving member 20, by means of the spring 29, causes the cylindrical positioning member 27 to move along the guide member 25 from its initial position (FIG. 2), in which the surface 32 causes the ring 12 to be aligned in a desired disk-attaching position, to a final position, in which the interior surface 38 of the member 27 engages the surface 40 of the body 24 (FIG. 3). In its final position, the smaller reference surface 33 is now aligned with the plane of the ring 12. Since the ring 12 is secured pneumatically against the lip 18, in a lateral position determined by the reference surface 32, there is no possibility of any lateral movement of the ring, even though the diameter of the surface 33 is smaller than the inner diameter of the ring 12.

With the surface 38 engaging the surface 40, further lowering of the mechanism 16 now drives the receiving member 20 into the housing of the disk stand 22 against the influence of the spring 29. As this movement occurs, the reference surface 33 becomes aligned with the plane of the disk 13 (FIG. 4). Since the surface 33 corresponds to the inner diameter of the disk 13, the disk is thereby caused to be positioned laterally in a position concentric with the ring 12.

With further downward movement, the force translating mechanism 16 presses the ring 12 against the disk 13, thereby attaching the ring to the disk by means of the adhesive 14. The drive means 23 then raises the mechanism 16 for repeating the aforementioned operation for the manufacturing of other flexible disks.

In the apparatus according to a preferred embodiment of the invention, the spindle drive aperture of the reinforcing ring 12 is slightly oversized with respect to the aperture of the disk 13. Thus, only the disk would contact the spindle of a disk drive mechanism. An advantage of this arrangement is that the adhesive of the ring is less likely to foul a disk drive spindle.

It will be understood by those skilled in the art, however, that the apparatus according to the invention may also be advantageously used when the inner diameter of the disk 13 is slightly larger than the inner diameter of the reinforcing ring 12. Preferably this would be the case when an adhesive, for bonding the ring and the disk together, is carried by the disk. With this arrangement, the disk and the ring may be interchanged; the disk is placed around the neck 15 of the mechanism 16 with centering by the larger reference surface 32; the ring is disposed about the receiving member 20, with centering by the reference surface 33. With this structure, the reinforcing ring is the only portion which contacts the drive spindle, whereas the PET disk material is isolated from a drive spindle. This structure is also particularly advantageous when means other than an adhesive such as welding, diffusion bonding, thermal bonding, ultrasonic bonding, riveting or stapling are employed for attaching the ring to the disk.

Preferably, the material for the reinforcing ring is selected to have an isotropic coefficient of expansion dependent on either temperature or humidity. When the inner diameter of the reinforcing ring is selected to precisely match the outside diameter of a drive spindle, the ring material should preferably be electrically conductive for facilitating the transfer of disk static charges to the spindle, to inhibit the build-up of static charges on the disk.

ADVANTAGEOUS TECHNICAL EFFECT

From the foregoing it is apparent that improved apparatus has been disclosed of simple design for centering and attaching a reinforcing ring in surrounding relationship to a central drive aperture of a flexible recording disk. Floppy disks manufactured by this improved apparatus will not only have an extended useful life by virtue of the reinforcing ring, but will always be precisely centered on a disk drive spindle. Since the disk is always accurately centered, indexing of a read/write head can be properly controlled and the read/write head need not be set to allow for a significant margin of error in the radial registration of disk data tracks. Consequently, it is feasible to use a narrower data track and to thus record a greater amount of data on each disk.

The invention has been described in detail with particular reference to a preferred embodiment thereof, but it will be understood that variations and modifications can be effected within the spirit and scope of the invention.

What is claimed is:

1. In apparatus including a force translating mechanism mounted for movement to and from a resiliently mounted receiving member, for cooperatively positioning and attaching a reinforcing ring in coaxial relationship to a flexible recording disk, the improvement comprising:

(a) a cylindrical positioning member mounted for axial movement relative to said force translating mechanism and having a first reference surface corresponding to the inner diameter of such a reinforcing ring and a second reference surface, concentric with and smaller than said first reference surface, corresponding to the inner diameter of such a flexible disk, said cylindrical positioning member, in response to movement of said force translating mechanism for attaching the reinforcing ring to the flexible disk, being moveable axially relative to said translating mechanism between (1) a first position in which said first reference surface causes said force translating mechanism to carry the reinforcing ring in a predetermined disk-attaching position, and (2) a second position engaging said receiving member in which said second reference surface causes the flexible disk to be located in a position concentric with the disk-attaching position of the reinforcing ring;

(b) said force translating mechanism, said positioning member, and said receiving member mutually cooperating during movement of said positioning member between its first and its second positions, to bring the reinforcing ring and the flexible disk into a bonding relationship during movement of said force translating mechanism toward said receiving member.

2. Apparatus as defined in claim 1 wherein said force translating member includes means defining a press concentric with said first and said second reference surfaces of said cylindrical positioning member, and drive means for moving said press defining means immediately adjacent said receiving member for attaching the reinforcing ring to the recording disk in a coaxial relationship.

3. Apparatus as defined in claim 1 wherein said force translating mechanism carries an elongate member defining a guiding surface, and a spring, interposed between said force translating mechanism and said cylindrical positioning member, resiliently biasing said positioning member in its first position at an end of said elongate member when said positioning member is disengaged from said receiving member.

4. Apparatus as defined in claim 3 wherein said receiving member is biased by a spring the force of which is stronger than said spring biasing said positioning member, and wherein said spring biasing said receiving member causes said receiving member to move said positioning member from its first position into its second position against the influence of said spring biasing said positioning member when said positioning member engages said receiving member during movement of said force translating mechanism toward said receiving member.

5. Apparatus as defined in claim 3 wherein said force translating mechanism includes means for retaining the reinforcing ring in its disk-attaching position during movement of said positioning member from its first position toward its second position.

* * * * *